United States Patent
Sakai et al.

(10) Patent No.: US 8,119,215 B2
(45) Date of Patent: Feb. 21, 2012

(54) OPTICAL RECORDING MEDIUM AND METHOD FOR MANUFACTURING THE SAME

(75) Inventors: Takemitsu Sakai, Miyagi (JP); Yuichi Sabi, Tokyo (JP); Etsuro Ikeda, Miyagi (JP)

(73) Assignee: Sony Corporation, Tokyo (JP)

( * ) Notice: Subject to any disclaimer, the term of this patent is extended or adjusted under 35 U.S.C. 154(b) by 339 days.

(21) Appl. No.: 12/293,575

(22) PCT Filed: Jan. 24, 2008

(86) PCT No.: PCT/JP2008/051462
§ 371 (c)(1),
(2), (4) Date: Sep. 19, 2008

(87) PCT Pub. No.: WO2008/091018
PCT Pub. Date: Jul. 31, 2008

(65) Prior Publication Data
US 2010/0233413 A1    Sep. 16, 2010

(30) Foreign Application Priority Data
Jan. 26, 2007    (JP) .................................. 2007-016839

(51) Int. Cl.
*B32B 3/02* (2006.01)

(52) U.S. Cl. .................. 428/64.1; 428/64.4; 430/270.12
(58) Field of Classification Search .................. None
See application file for complete search history.

(56) References Cited

U.S. PATENT DOCUMENTS
2005/0276946 A1*  12/2005  Sabi et al. ............... 428/64.4
2008/0233389 A1*   9/2008  Sakai et al. ............... 428/336
2010/0047503 A1*   2/2010  Sakai et al. ............... 428/64.4

FOREIGN PATENT DOCUMENTS
| JP | 60-257291 | 12/1985 |
| JP | 2004-158134 | 6/2004 |
| JP | 2005-313474 | 11/2005 |
| JP | 2006-281751 | 10/2006 |
| JP | 2006-347082 | 12/2006 |

OTHER PUBLICATIONS
International Search Report dated Apr. 15, 2008.
European Communication dated Jul. 19, 2011 for Application No. 08704215.6-1232/2052870.

* cited by examiner

*Primary Examiner* — Elizabeth Mulvaney
(74) *Attorney, Agent, or Firm* — SNR Denton US LLP

(57) ABSTRACT

A write-once type optical recording medium 10 has an inorganic recording film 2. The inorganic recording film 2 has an oxide film 2a containing an oxide of germanium (Ge) and an adjacent film 2b which contains titanium (Ti) and manganese (Mn) and is adjacent to the oxide film 2a.

5 Claims, 3 Drawing Sheets

OPTICAL RECORDING MEDIUM AND METHOD FOR MANUFACTURING THE SAME

TECHNICAL FIELD

The invention relates to an optical recording medium and its manufacturing method. More particularly, the invention relates to an optical recording medium having an inorganic recording film.

BACKGROUND ART

In recent years, an optical recording medium of a high-density recording in which information of a large volume can be recorded is demanded. For example, to meet the demand, the standard ver.1.1 of a Blu-ray Disc (registered trademark; hereinbelow, BD) has been specified and a high-definition image can be recorded and stored into the optical recording medium. Assuming that a normal reproducing speed of the high-definition is a one-time speed (1×), according to the standard ver.1.1 of the BD, the disc has already coped with the recording of up to a 2-times speed (2×).

However, a user demands a higher-speed for recording. At a speed near 10000 rpm which is considered to be a limit of a rotational speed of the disc, the disc has to cope with a 4-times speed (4×) in a CLV (Constant Linear Velocity) mode. Further, in the future, it is necessary to cope with the recording at a speed over a 10-times speed (10×) in a CAV (Constant Angular Velocity) mode. Therefore, it is necessary that the optical recording medium has sufficient recording characteristics even in such a high-speed recording.

On the other hand, as a BD-R (BD-Rewitable) media corresponding to the recording of up to the 2-times speed (2×), a media having an oxide film made of an oxide film of germanium (Ge) and a metal film which is provided adjacently to the oxide film and is made of titanium (Ti) is available on market (for example, refer to JP-A-2006-281751). Although such a write-once type optical recording medium is constructed by a 3-layered film or a 4-layered film, the medium has a wide power margin and high durability.

DISCLOSURE OF INVENTION

However, in the write-once type optical recording medium having the foregoing film construction, if an information signal is recorded at a linear velocity of the 4-times speed (4×), the power margin is narrow and it is necessary to improve the narrow power margin.

It is, therefore, an object of the invention to provide an optical recording medium having an inorganic recording film, in which a power margin in a high-speed recording can be improved and to provide a manufacturing method of such a medium.

The present inventors have conducted vigorous researches in order to solve the foregoing problem which the related art has. Its outline will be described hereinbelow.

According to the knowledge of the present inventors, in order to realize a wide enough power margin in the high-speed recording without increasing the total number of films, it is effective to add an additive to a material of each layer. Further, according to the knowledge of the present inventors, in the write-once type optical recording medium having an oxide film containing an oxide of germanium (Ge) and an adjacent film containing titanium (Ti) as inorganic recording films, it is a recording principle that the oxide film is separated into two layers of different oxygen compositions upon recording. Such a separation occurs because the adjacent film is adjacent to the oxide film. The adjacent film surface has an important role in the oxygen separation and it is considered that it is a recording principle that a titanium (Ti) oxide on the adjacent film surface absorbs recoding light and a photocatalyst effect appears. It is indirectly verified because there was obtained such an experiment result that in the case where an alloy in which a material which does not contain titanium (Ti), for example, aluminum (Al) or silver (Ag) is contained as a main component is used for the adjacent film or an inert dielectric film of merely a few nm of SiN, ZnS—$SiO_2$, or the like is formed between the adjacent film and the oxide film, a modulation degree deteriorates extremely and the oxide film is not clearly separated.

Therefore, on the basis of the knowledge regarding the foregoing recording principle, the present inventors have conducted vigorous researches in order to improve the recording characteristics upon high-speed recording. Thus, it has been found that in the case where the additive has been added to the adjacent film, the additive exerts a large influence on the recording characteristics, and in the case where manganese (Mn) has been added to the adjacent film, a wide power margin is obtained, particularly, in the high-speed recording.

The invention is derived on the basis of the above examination.

To solve the foregoing problems, according to the first invention of the present invention, there is provided an optical recording medium having an inorganic recording film, characterized in that the inorganic recording film has:

an oxide film containing an oxide of germanium (Ge); and an adjacent film which contains titanium (Ti) and manganese (Mn) and is adjacent to the oxide film.

According to the second invention of the present invention, there is provided a manufacturing method of an optical recording medium having an inorganic recording film, characterized by including the steps of:

forming an oxide film containing an oxide of germanium (Ge); and forming an adjacent film which contains titanium (Ti) and manganese (Mn) and is adjacent to the oxide film.

According to the invention, it is presumed that since the adjacent film contains manganese (Mn), a separating speed of oxygen in the oxide film can be further raised.

As described above, according to the invention, since the adjacent film contains titanium (Ti) and manganese (Mn), a power margin in the high-speed recording can be improved. Therefore, recording characteristics in the high-speed recording can be improved.

BEST MODE FOR CARRYING OUT THE INVENTION

Embodiments of the invention will be described hereinbelow with reference to the drawings.

(1) First Embodiment

(1-1) Construction of Write-Once Type Optical Recording Medium

Figure 1:
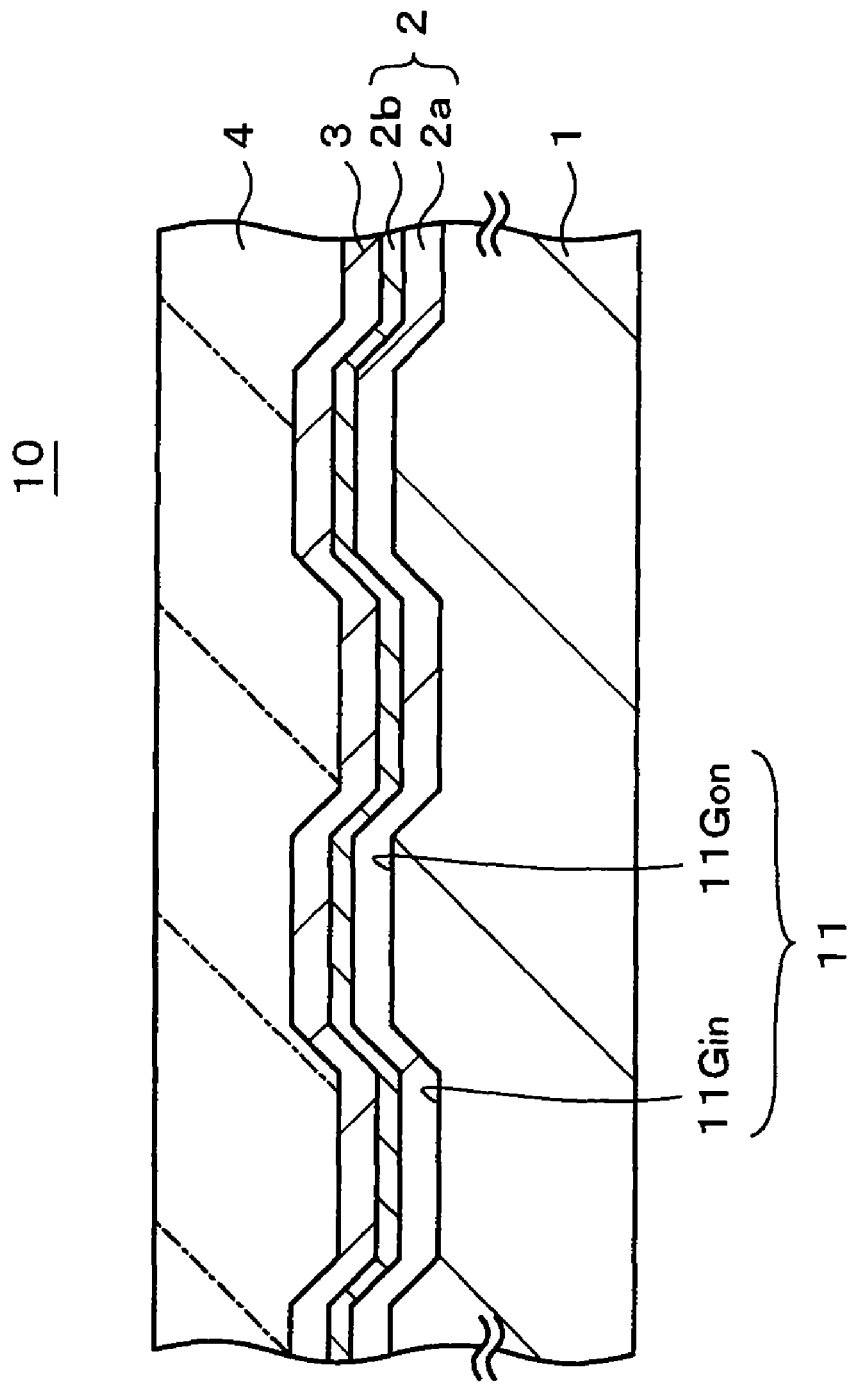
FIG. 1 is a schematic cross sectional view showing a constructional example of a write-once type optical recording medium according to a first embodiment of the invention.

FIG. 1 is a schematic cross sectional view showing a constructional example of a write-once type optical recording medium according to the first embodiment of the invention. A write-once type optical recording medium 10 has a construction in which an inorganic recording film 2, a dielectric film 3, and a light transmitting layer 4 have sequentially been laminated onto a substrate 1.

In the write-once type optical recording medium 10 according to the first embodiment, by irradiating a laser beam from the side of the light transmitting layer 4 to the inorganic recording film 2, a recording and/or a reproduction of an information signal are/is executed. For example, the laser beam having a wavelength in a range from 400 nm to 410 nm is converged by an objective lens having a numerical aperture in a range from 0.84 to 0.86 and irradiated from the side of the light transmitting layer 4 to the inorganic recording film 2, so that the recording and/or the reproduction of the information signal are/is executed. As such a write-once type optical recording medium 10, for example, a BD-R can be mentioned.

The substrate 1, inorganic recording film 2, dielectric film 3, and light transmitting layer 4 constructing the write-once type optical recording medium 10 will be sequentially described hereinbelow.

(Substrate)

The substrate 1 has a ring shape in which an opening (hereinbelow, referred to as a center hole) has been formed at the center. One principal plane of the substrate 1 is a concave/convex surface 11. The inorganic recording film 2 is formed on the concave/convex surface 11. Hereinbelow, a concave portion of the concave/convex surface 11 is referred to as an in-groove 11Gin and a convex portion of the concave/convex surface 11 is referred to as an on-groove 11Gon.

As shapes of the in-groove 11Gin and the on-groove 11Gon, for example, various shapes such as spiral shape, concentric shape can be mentioned. The in-groove 11Gin and/or the on-groove 11Gon is wobbled in order to add address information.

A diameter of substrate 1 is selected to, for example, 120 mm. A thickness of substrate 1 is selected in consideration of a rigidity, preferably is selected from 0.3 mm to 1.3 mm, more preferably is selected from 0.6 mm to 1.3 mm, and is selected to, for example, 1.1 mm. A diameter of center hole 1a is selected to 15 mm.

As a material of the substrate 1, for example, a plastic material such as polycarbonate type resin, polyolefin type resin, acrylic type resin, or glass, or the like can be used. In the case of considering the costs, it is preferable to use the plastic material as a material of the substrate 1.

(Inorganic Recording Film)

The inorganic recording film 2 is constructed by a metal film 2a and an oxide film 2b which is sequentially laminated onto the concave/convex surface 11 of the substrate 1. The metal film 2a contains titanium (Ti) and manganese (Mn). If titanium (Ti) and manganese (Mn) are used as main materials, generally good recording characteristics can be obtained. A content of manganese (Mn) lies within a range, preferably, from 1 atom % to 40 atom %, more preferably, from 2 atom % to 30 atom %, and further preferably, from 5 atom % to 28 atom %. This is because by setting the content of manganese (Mn) within such a range, the power margin in the high-speed recording can be improved and the recording characteristics in the high-speed recording can be improved. It is also preferable to allow a small quantity of nitrogen (N) to be contained in the metal film 2a. Thereby, a recording sensitivity can be adjusted.

The oxide film 2b is made of, for example, GeO which is an oxide of germanium (Ge). An absorption coefficient k of the oxide film 2b lies within a range, preferably, from 0.15 to 0.90, more preferably, from 0.20 to 0.70, and further preferably, from 0.25 to 0.60. A thickness of oxide film 2b lies within a range, preferably, from 10 nm to 35 nm. By satisfying the range from 0.15 to 0.90, for example, a good modulation degree and a carrier-to-noise ratio (hereinbelow, referred to as a C/N ratio) can be obtained. By satisfying the range from 0.20 to 0.70, for example, the better modulation degree and C/N ratio can be obtained. By satisfying the range from 0.25 to 0.60, for example, the even better modulation degree and C/N ratio can be obtained.

The absorption coefficient k in the specification is a value measured at the wavelength of 410 nm. For the measurement, an ellipsometer (made by Rudolph Co., Ltd.; trade name: Auto EL-462P17) is used.

An additive may be added to the oxide film 2b. As an additive, for example, tellurium (Te), palladium (Pd), platinum (Pt), chromium (Cr), zinc (Zn), gold (Au), silicon (Si), titanium (Ti), iron (Fe), nickel (Ni), tin (Sn), antimony (Sb), manganese (Mn), indium (In), zirconium (Zr), or the like can be used. By adding such an additive, a durability and/or a reactivity (recording sensitivity) can be improved. To improve the durability, particularly, palladium (Pd), platinum (Pt), chromium (Cr), or antimony (Sb) is especially preferable.

(Dielectric Film)

The dielectric film 3 is provided on the inorganic recording film 2 in contact therewith and is used to make an optical and mechanical protection of the inorganic recording film 2, that is, an improvement of the durability, a suppression of a deformation, that is, swell of the inorganic recording film 2 upon recording, and the like. As a dielectric film 3, for example, SiN, ZnS—$SiO_2$, AlN, $Al_2O_3$, $SiO_2$, $SiO_2$—$Cr_2O_3$—$ZrO_2$ (SCZ), or the like can be used. To improve the S/N ratio of the recording signal and obtain the good characteristics, it is preferable to use ZnS—$SiO_2$ as a dielectric film 3. A thickness of dielectric film 3 lies within a range, for example, from 10 nm to 100 nm.

(Light Transmitting Layer)

The light transmitting layer 4 is constructed by, for example; a light transmitting sheet (film) having a ring shape; and an adhesive layer for adhering the light transmitting sheet onto the substrate 1. The adhesive layer is made of, for example, an ultraviolet hardening resin or a Pressure Sensitive Adhesive (PSA). A thickness of light transmitting layer 4 is selected from a range, preferably, from 10 μm to 177 μm and is selected to, for example, 100 μm. The high-density recording can be realized by combining such a thin light transmitting layer 4 and the objective lens having a high NA (numerical aperture) of, for example, about 0.85.

It is preferable that the light transmitting sheet is made of a material whose absorbing performance to the laser beam which is used for recording and/or reproduction is low. Specifically, it is preferable that the light transmitting sheet is made of a material whose transmissivity is equal to or larger than 90%. As a material of the light transmitting sheet, for example, a polycarbonate resin material or a polyolefin type resin (for example, Xeonex (registered trademark)) can be mentioned.

A thickness of light transmitting sheet is selected to, preferably, 0.3 mm or less and is selected, more preferably, from a range from 3 µm to 177 µm. A bore (diameter) of the light transmitting layer 4 is selected to, for example, 22.7 mm.

(1-2) Manufacturing Method of Write-Once Type Optical Recording Medium

Subsequently, an example of a manufacturing method of the write-once type optical recording medium according to the first embodiment of the invention will be described.

(Molding Step of Substrate)

First, the substrate 1 in which the concave/convex surface 11 has been formed on one principal plane is molded. As a molding method of the substrate 1, for example, an injection molding (injection) method, a photopolymer method (2P method: Photo Polymerization), or the like can be used.

(Film Forming Step of Metal Film)

Subsequently, the substrate 1 is conveyed into a vacuum chamber having a target made of, for example, titanium (Ti) and manganese (Mn) and the inside of the vacuum chamber is vacuumed until its pressure becomes a predetermined pressure. After that, while introducing a process gas into the vacuum chamber, the target is sputtered and the metal film 2a is formed onto the substrate 1.

An example of film forming conditions in the film forming step is shown below.

Ultimate vacuum: $5.0 \times 10^{-5}$ Pa
Atmosphere: 0.1 to 0.6 Pa
Applied electric power: 1 to 3 kW
Gas kind: Ar gas and $N_2$ gas
Ar gas flow rate: 10 to 40 sccm
$N_2$ gas flow rate: 1 to 10 sccm (Film Forming Step of Oxide Film)

Subsequently, the substrate 1 is conveyed into the vacuum chamber having a target made of, for example, germanium (Ge) and the inside of the vacuum chamber is vacuumed until its pressure becomes the predetermined pressure. After that, while introducing the process gas into the vacuum chamber, the target is sputtered and the oxide film 2b is formed over the substrate 1.

An example of film forming conditions in the film forming step is shown below.

Ultimate vacuum: $5.0 \times 10^{-5}$ Pa
Atmosphere: 0.1 to 0.6 Pa
Applied electric power: 1 to 3 kW
Gas kind: Ar gas and $O_2$ gas
Ar gas flow rate: 24 sccm
$O_2$ gas flow rate: 9 sccm (Film Forming Step of Dielectric Film)

Subsequently, the substrate 1 is conveyed into the vacuum chamber having a target made of, for example, $ZnS$—$SiO_2$ and the inside of the vacuum chamber is vacuumed until its pressure becomes the predetermined pressure. After that, while introducing the process gas into the vacuum chamber, the target is sputtered and the dielectric film 3 is formed over the substrate 1.

An example of film forming conditions in the film forming step is shown below.

Ultimate vacuum: $5.0 \times 10^{-5}$ Pa
Atmosphere: 0.1 to 0.6 Pa
Applied electric power: 1 to 4 kW
Gas kind: Ar gas
Ar gas flow rate: 6 sccm (Film Forming Step of Light Transmitting Layer)

Subsequently, the ring-shaped light transmitting sheet is adhered onto the concave/convex surface 11 side on the substrate 1 by using the pressure sensitive adhesive (PSA) with which one principal plane of the sheet has previously and uniformly coated. Thus, the light transmitting layer 4 is formed so as to cover each of the films formed on/over the substrate 1.

The write-once type optical recording medium 10 shown in FIG. 1 is obtained by the foregoing steps.

According to the first embodiment of the invention, the following effects can be obtained.

Since the write-once type optical recording medium 10 can be formed merely by sequentially laminating the metal film 2a, oxide film 2b, dielectric film 3, and light transmitting layer 4 onto the substrate 1, the write-once type optical recording medium 10 of the high recording density having the simple film structure, that is, the low-priced write-once type optical recording medium 10 of the high recording density can be provided.

The power margin or the like in the high-speed recording can be improved merely by adding manganese (Mn) into the metal film 2a. Therefore, the write-once type optical recording medium 10 whose recording characteristics in the high-speed recording are excellent can be provided by the total number of films of, for example, three or four layers or less without increasing the total number of films. That is, the write-once type optical recording medium 10 whose recording characteristics in the high-speed recording are excellent can be provided without causing an increase in plant and equipment investment costs. In addition, since the metal film 2a contains titanium (Ti), the excellent durability can be also realized.

Since manganese (Mn) has a low thermal conductivity, the stable recording sensitivity can be realized. Further, since manganese (Mn) is a transition element and is also chemically extremely stable like titanium (Ti), the excellent durability can be realized. Therefore, in the write-once type optical recording medium 10 having the metal film 2a containing titanium (Ti) and manganese (Mn), the improvement of the recording characteristics in the high-speed recording (wide power margin) can be obtained while having the stable recording sensitivity and durability.

Upon recording, physical characteristics of the metal film 2a hardly change between timing before the recording and timing after the recording and the metal film 2 functions as a film which promotes a reaction at an interface between the metal film 2 and the oxide film 2b, that is, which causes what is called a catalytic operation. After the recording, oxygen in the oxide film 2b is separated and a Ge layer containing a large quantity of oxygen compositions is formed in the interface of the metal film 2a. In this manner, the oxide film 2b is separated into stable two layers whose optical constants differ and whose preservation stability is high. When a reproducing light is irradiated to the oxide film 2b which has been separated into the two layers as mentioned above, a reflection light amount changes, so that a good reproduction signal is obtained.

(2) Second Embodiment

According to the second embodiment, a dielectric film is constructed by a plurality of dielectric films of different materials and compositions. A case where the dielectric film is constructed by dielectric films of two layers of different materials and compositions will be described as an example.

Figure 2:
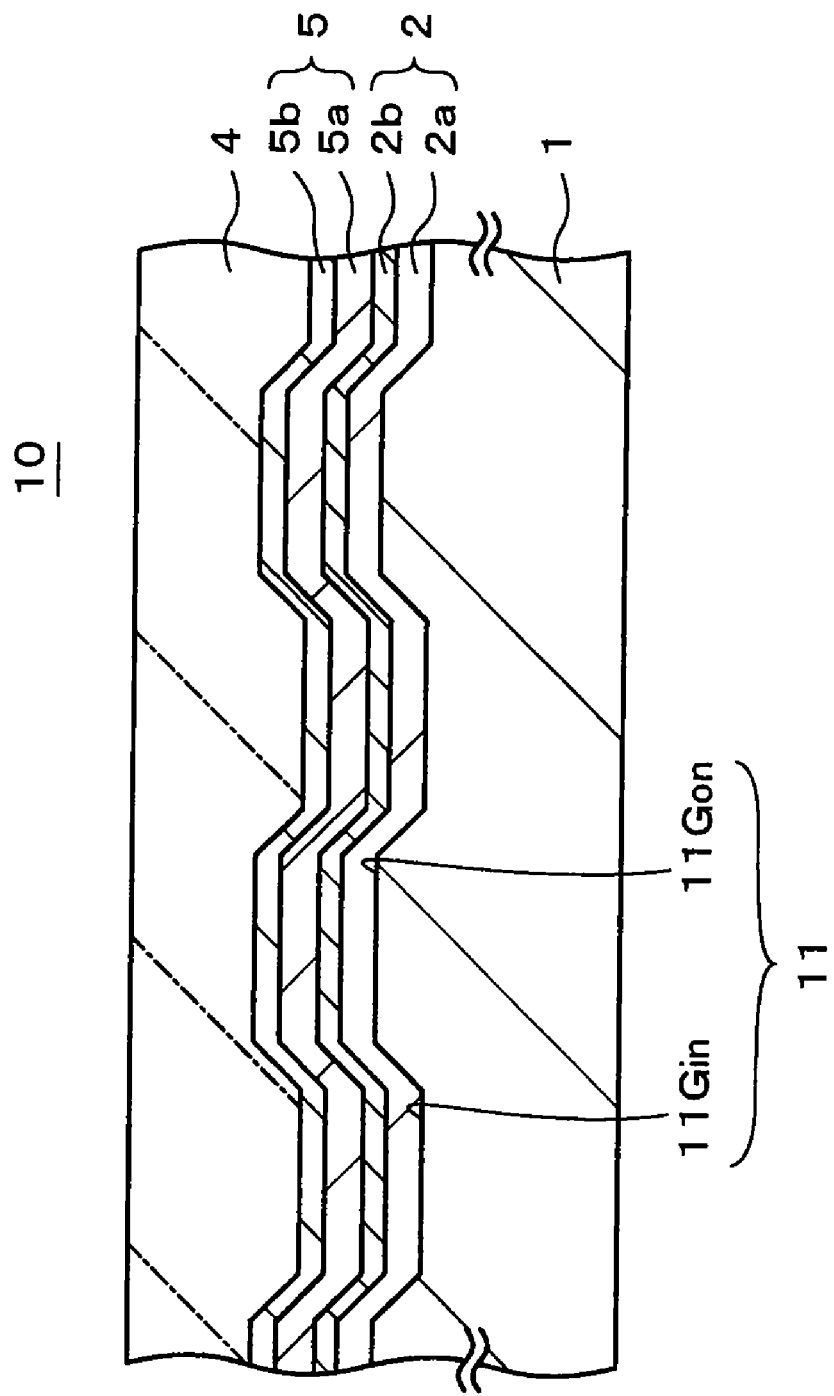
FIG. 2 is a schematic cross sectional view showing a constructional example of a write-once type optical recording medium according to a second embodiment of the invention.

FIG. 2 is a cross sectional view showing a constructional example of an optical recording medium according to the second embodiment of the invention. Portions similar to those in the foregoing first embodiment are designated by the same reference numerals and their description is omitted.

A dielectric film 5 is constructed by a first dielectric film 5a and a second dielectric film 5b and the second dielectric film 5b is provided on the side of the light transmitting layer 4. The first dielectric film 5a is made of, for example, ZnS—SiO$_2$ of a high film forming speed. The second dielectric film 5b is made of, for example, a dielectric material such as SiN or the like which is more stable than ZnS—SiO$_2$.

According to the second embodiment of the invention, the following effects besides the effects of the foregoing first embodiment can be obtained.

Since the second dielectric film 5b is provided between the first dielectric film 5a and the light transmitting layer 4, such a situation that a component such as sulfur (S) contained in the first dielectric film 5a reacts to the PSA or the like of the light transmitting layer 4, the light transmitting layer 4 deteriorates, and the durability deteriorates can be suppressed. That is, such a situation that a large aberration occurs in a light spot the reproduction signal deteriorates or the like can be suppressed.

The invention will be specifically explained hereinbelow by Examples. The invention is not limited only to those Examples. In the following Examples, portions corresponding to the foregoing embodiment are designated by the same reference numerals.

As an Example of the invention, the write-once type optical recording medium 10 designed in accordance with an optical disc recording and reproducing apparatus using a 2-group objective lens having a numerical aperture of 0.85 and a blue-violet semiconductor laser light source having a wavelength of 405 nm serving as an optical system of the BD is shown.

As an evaluating apparatus, a BD disc inspector "ODU-1000" made by Pulstec Industrial Co., Ltd. is used. A wavelength of light source is 405.2 nm.

As for a jitter, a signal which has passed through an equalizer board made by Pulstec Industrial Co., Ltd. is measured by using a time interval analyzer "TA720" made by Yokogawa Electric Corporation. The equalizer conforms with the standard and the jitter of the signal obtained after passing through a limit equalizer is measured.

In addition, in order to measure an amplitude, a modulation degree, and the like, a digital oscilloscope "TDS7104" made by Tektronix Inc. is used.

A linear velocity upon recording is set to 19.67 m/sec (4-times speed recording). A linear velocity upon reproduction is set to 4.92 m/sec (1-time speed). A channel bit length is set to 74.50 nm (recording density of 25 GB for an optical disc having a diameter of 12 cm).

A modulating system is set to 17PP. A mark length of a 2T mark as a shortest mark is equal to 0.149 μm. A mark length of an 8T mark is equal to 0.596 μm. A truck pitch is set to 0.32 μm.

Although there are several specific methods with respect to the measurement of the power margin, in the specification, a range where a jitter value after passing through the limit equalizer is equal to or less than 8.5% is defined as a margin of the recording sensitivity and a value obtained by dividing its power range by an optimum power is defined as a power margin.

Example 1

First, the polycarbonate substrate (hereinbelow, referred to as a PC substrate) 1 having a thickness of 1.1 mm was manufactured by injection molding. The concave/convex surface 11 having the in-groove 11Gin and the on-groove 11Gon was formed on the PC substrate 1. A depth of in-groove 11Gin was set to 20 nm and a track pitch was set to 0.32 μm.

Subsequently, the TiMn film 2a having a thickness of 22 nm, the GeO film 2b having a thickness of 25 nm, the ZnS—SiO$_2$ film 5a having a thickness of 52 nm, and the SiN film 5b having a thickness of 4 nm were sequentially formed on the substrate 1 by using a film forming apparatus (made by Unaxis Co., Ltd., trade name: Sprinter). After that, a polycarbonate sheet (hereinbelow, referred to as a PC sheet) was adhered onto the concave/convex surface 11 side of the PC substrate 1 by the pressure sensitive adhesive (PSA) and the light transmitting layer 4 was formed onto the SiN film 5b. A thickness of light transmitting layer 4 was set to 100 μm including the PSA and the PC sheet. Thus, the target write-once type optical recording medium 10 was obtained.

The film forming conditions of each film are shown hereinbelow.

First, after the inside of the vacuum chamber was vacuumed, while introducing an Ar gas and an N$_2$ gas into the vacuum chamber, the TiMn target was sputtered and the TiMn film 2a having a thickness of 22 nm was formed onto the substrate 1. A content of Mn in the TiMn target was set to 20 atom %.

The film forming conditions in the film forming step are shown below.

Ultimate vacuum: $5.0 \times 10^{-5}$ Pa
Atmosphere: 0.2 Pa
Applied electric power: 3 kW
Ar gas flow rate: 30 sccm
N$_2$ gas flow rate: 6 sccm Subsequently, after the inside of the vacuum chamber was vacuumed, while introducing the Ar gas and an O$_2$ gas into the vacuum chamber, the Ge target was reactive-sputtered and the GeO film 2b having a thickness of 25 nm was formed onto the TiMn film 2a. An oxygen content in the GeO film 2b was set to a value at which the absorption coefficient k of the GeO film 2b was equal to 0.6.

The film forming conditions in the film forming step are shown below.

Ultimate vacuum: $5.0 \times 10^{-5}$ Pa
Atmosphere: 0.2 Pa
Applied electric power: 2 kW
Ar gas flow rate: 30 sccm
Oxygen gas flow rate: 44 sccm Subsequently, after the inside of the vacuum chamber was vacuumed, while introducing the Ar gas into the vacuum chamber, the ZnS—SiO$_2$ target was sputtered and the ZnS—SiO$_2$ film 5a having a thickness of 52 nm was formed onto the GeO film 2b. A composition ratio (atom ratio) ZnS:SiO$_2$ in the ZnS—SiO$_2$ film 5a was set to 80:20.

The film forming conditions in the film forming step are shown below.

Ultimate vacuum: $5.0 \times 10^{-5}$ Pa
Atmosphere: 0.1 Pa
Applied electric power: 1 kW
Ar gas flow rate: 6 sccm Subsequently, after the inside of the vacuum chamber was vacuumed, while introducing the Ar gas and the N$_2$ gas into the vacuum chamber, the Si target was sputtered and the Si$_3$N$_4$ film 5b having a thickness of 10 nm was formed over the substrate 1.

The film forming conditions in the film forming step are shown below.

Ultimate vacuum: $5.0 \times 10^{-5}$ Pa
Atmosphere: 0.3 Pa

Applied electric power: 4 kW
Ar gas flow rate: 50 sccm
N₂ gas flow rate: 37 sccm The recording and reproduction were executed under the above conditions to the write-once type optical recording medium 10 obtained as mentioned above, so that the recording sensitivity of 10.2 mW and a bottom jitter of 6.5% were obtained. The power margin according to the foregoing definition was equal to 21.6% and the good recording is executed.

Comparison 1

Subsequently, all conditions were set to be similar to those in Example 1 except that the material of the TiMn film 2 was changed to TiSi, and the write-once type optical recording medium 10 was obtained. An Si content was set to 25 atom %. The film forming conditions of the TiSi film are shown below.

Ultimate vacuum: $5.0 \times 10^{-5}$ Pa
Atmosphere: 0.2 Pa
Applied electric power: 3 kW
Ar gas flow rate: 30 sccm
N₂ gas flow rate: 7.5 sccm The write-once type optical recording medium 10 which is obtained under the above film forming conditions is an SL (SingleLayer) media which conforms with ver.1.1 of the BD-R.

The recording and reproduction were executed under the above conditions to the write-once type optical recording medium 10 obtained as mentioned above, so that the recording sensitivity of 10.7 mW and a bottom jitter of 6.5% were obtained. The power margin according to the foregoing definition was equal to 170. Therefore, it will be understood that according to the write-once type optical recording medium 10 of Example 1, while the recording sensitivity is improved by 0.5 mW and the power margin is improved by 4.6 points as compared with those in Comparison 1.

Examples 2 to 16

Comparison 2

Subsequently, all conditions were set to be similar to those in Example 1 except that the content of Mn (manganese) in the TiMn film 2a was changed within a range from O atom % to 50 atom %, and a plurality of write-once type optical recording media 10 were obtained. The power margins, sensitivities, and bottom jitters of the write-once type optical recording media 10 obtained as mentioned above were derived in a manner similar to Example 1. Their results are shown in Table 1 and FIG. 3.

TABLE 1

|  | Mn CONTENT [atom %] | POWER MARGIN [%] | RECORDING SENSITIVITY [mW] | JITTER [%] |
| --- | --- | --- | --- | --- |
| COMPARISON 2 | 0 | 15.0 | 12.0 | 8.0 |
| EXAMPLE 2 | 1 | 16.0 | 11.1 | 7.2 |
| EXAMPLE 3 | 2 | 17.0 | 10.7 | 6.5 |
| EXAMPLE 4 | 5 | 22.3 | 10.3 | 6.6 |
| EXAMPLE 5 | 8 | 22.2 | 10.0 | 6.6 |
| EXAMPLE 6 | 10 | 23.0 | 10.0 | 6.5 |
| EXAMPLE 7 | 13 | 22.9 | 10.6 | 6.5 |
| EXAMPLE 8 | 15 | 22.0 | 10.4 | 6.5 |
| EXAMPLE 9 | 17 | 21.6 | 10.4 | 6.6 |
| EXAMPLE 10 | 18 | 21.0 | 10.4 | 6.4 |
| EXAMPLE 11 | 20 | 21.6 | 10.2 | 6.3 |
| EXAMPLE 12 | 25 | 21.1 | 10.3 | 6.4 |
| EXAMPLE 13 | 28 | 20.7 | 10.3 | 6.4 |
| EXAMPLE 14 | 30 | 18.0 | 10.7 | 6.6 |
| EXAMPLE 15 | 40 | 15.0 | 10.8 | 6.5 |
| EXAMPLE 16 | 50 | 12.6 | 10.8 | 6.5 |

Figure 3:
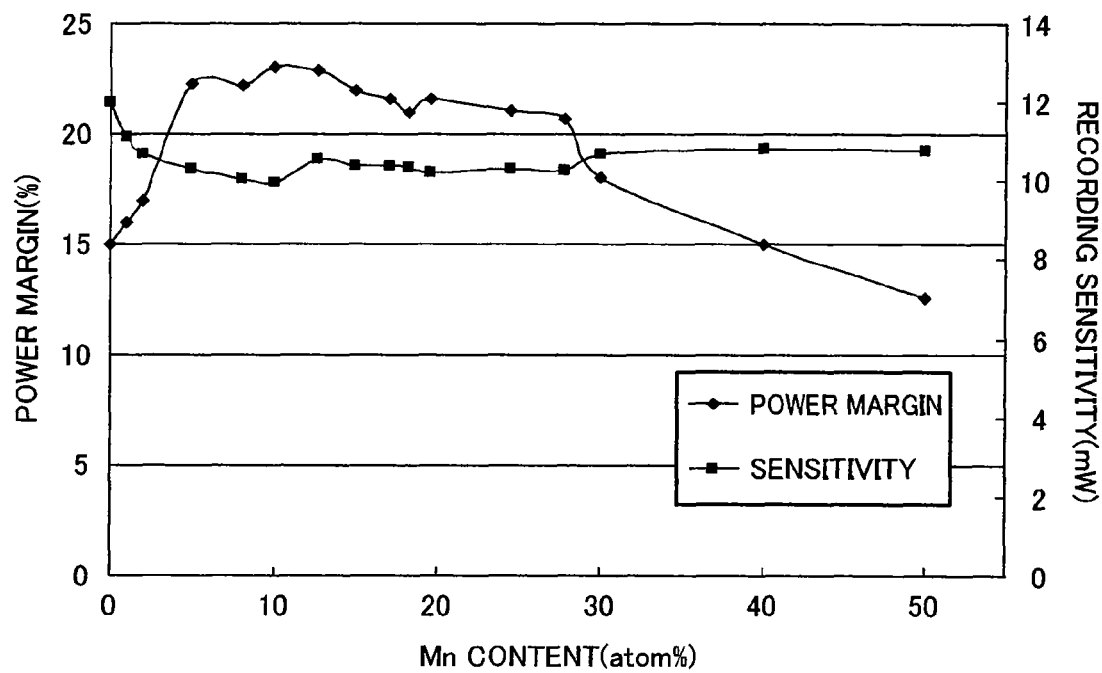
FIG. 3 is a graph showing relations among an Mn content, a power margin, and a recording sensitivity in Examples 2 to 15 and Comparison 2.

The following points will be understood from Table 1 and FIG. 3 with respect to (a) the power margin, (b) the recording sensitivity, and (c) the bottom jitter.

(a) Power Margin

When the Mn content in the TiMn film 2a is less than 5 atom %, the power margin starts to become suddenly narrow. When the Mn content is equal to 2 atom %, the power margin is equal to 17% similar to that in Comparison 1 having the TiSi film. When the Mn content is equal to 18 atom % or more, the power margin is slightly narrow. When the Mn content exceeds 28 atom %, the power margin starts to become suddenly narrow. When the Mn content is equal to 30 atom %, the power margin is equal to 18 atom % similar to that in Comparison 1. When the Mn content exceeds 40 atom %, the power margin is smaller than that in Comparison 2 in which the Mn content is equal to O atom %.

(b) Recording Sensitivity

If Mn is contained, the recording sensitivity is improved. When the Mn content lies within a range from 1 atom % to 30 atom %, although the recording sensitivity fluctuates slightly, it is held within a range from 10.0 to 11.1 mW. When the Mn content exceeds 30 atom %, the power margin becomes almost constant.

(c) Bottom Jitter

When the Mn content is equal to 0 atom %, the bottom jitter deteriorates to 8.0% due to an increase in noises. However, if Mn of 1 atom % is contained, the bottom jitter decreases to 7.2%. When the Mn content is equal to 2 atom % or more, the bottom jitter is equal to about 6.5% irrespective of the content.

When considering the above points, it is preferable to use the TiMn film 2a added with Mn in order to cope with the high-speed recording. The Mn content lies within a range, preferably, from 1 atom % to 40 atom %, more preferably, from 2 atom % to 30 atom %, and further preferably, from 5 atom % to 28 atom %.

Furthermore, when comparing Comparison 1 with Examples 2 to 15, it will be understood that by using the TiMn film 2a added with Mn, the better recording than that in Comparison 1 can be executed and the wider power margin can be obtained.

Although the embodiments and Examples of the invention have specifically been described above, the invention is not limited to the foregoing embodiments and Examples but various kinds of modifications based on the technical idea of the invention are possible.

For example, the numerical values mentioned in the foregoing embodiments and Examples are nothing but examples and other numerical values different from them may be used as necessary.

In addition, although the above embodiments and Examples have been described with respect to the case where the oxide film 2b is made of the oxide film of one layer, the oxide film 2b can be also formed by oxide films of two or more layers having different materials, compositions, and the like.

In addition, although the above embodiments and Examples have been described with respect to the case where the metal film 2a is made of the metal film of one layer, the metal film 2a can be also formed by metal films of two or more layers having different materials, compositions, and the like.

In addition, although the above embodiments and Examples have also been described with respect to the case where the metal film 2a is made of titanium (Ti) and manganese (Mn), metal materials which exhibit the photocatalyst effect other than titanium (Ti) or the like may be used in place of titanium (Ti).

The invention claimed is:

1. An optical recording medium comprising
an inorganic recording film comprising:
   an oxide film containing an oxide of germanium (Ge); and
   an adjacent film containing titanium (Ti) and manganese (Mn) and that is adjacent to said oxide film,
   wherein,
      a content of manganese (Mn) in the adjacent film is within a range from about 1 atom % to about 40 atom %.

2. The optical recording medium according to claim 1, wherein the content of manganese (Mn) in said adjacent film is within a range from about 5 atom % to about 28 atom %.

3. The optical recording medium according to claim 1 further comprising one or more dielectric films formed on top of the adjacent film.

4. A manufacturing method of an optical recording medium having an inorganic recording film, comprising the steps of:
   forming an oxide film containing an oxide of germanium (Ge); and
   forming an adjacent film containing titanium (Ti) and manganese (Mn) and that is adjacent to said oxide film,
   wherein,
      a content of manganese (Mn) in the adjacent film is within a range from about 1 atom % to about 40 atom %.

5. The manufacturing method according to claim 4 further comprising the step of forming one or more dielectric films on top of the adjacent film.

* * * * *